Figure 1:
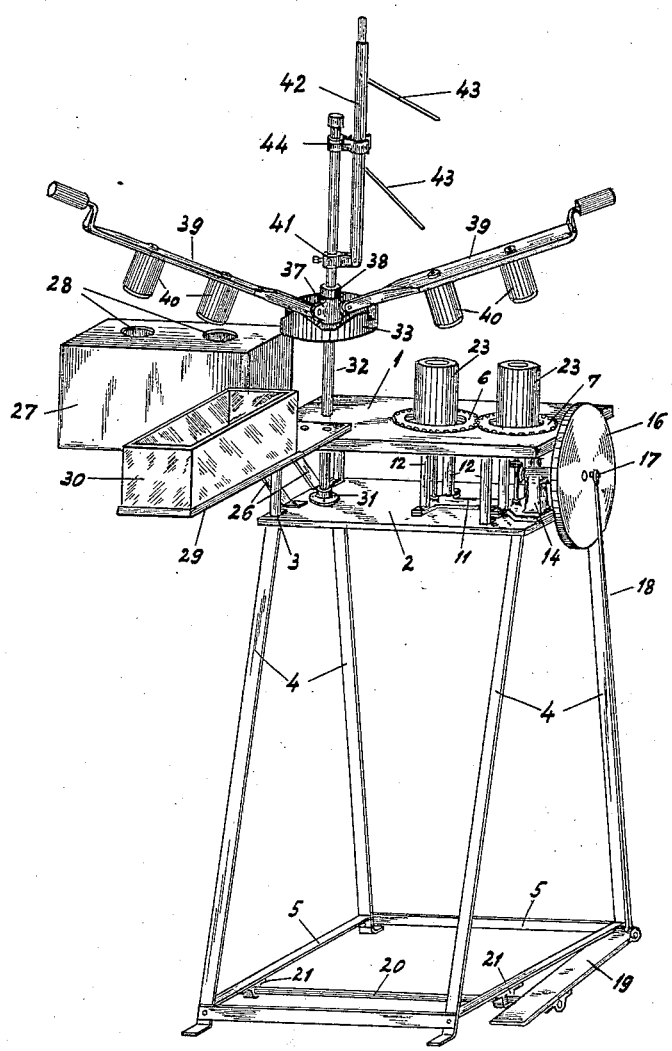

W. I. IRWIN.
CAN SOLDERING MACHINE.
APPLICATION FILED MAY 11, 1912.

1,043,317.

Patented Nov. 5, 1912.
3 SHEETS—SHEET 1.

WITNESSES:
E. M. Frankland
Wm. Brustein

INVENTOR
WILEY I. IRWIN
BY John M. Spellman
ATTORNEY

W. I. IRWIN.
CAN SOLDERING MACHINE.
APPLICATION FILED MAY 11, 1912.
1,043,317.
Patented Nov. 5, 1912.
3 SHEETS—SHEET 2.
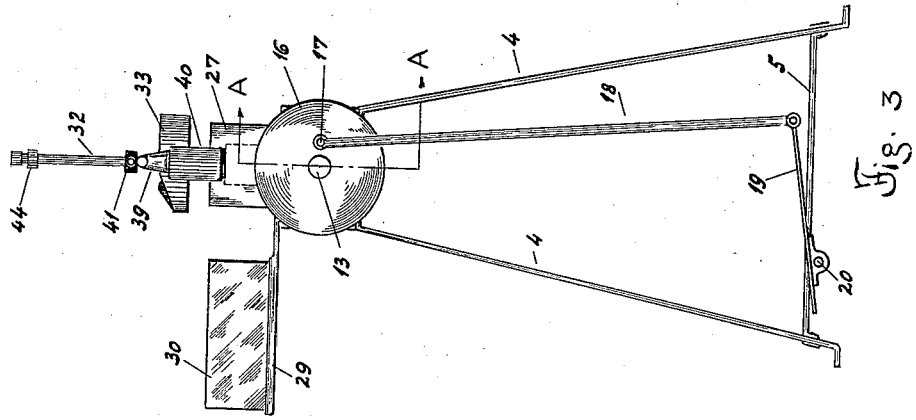
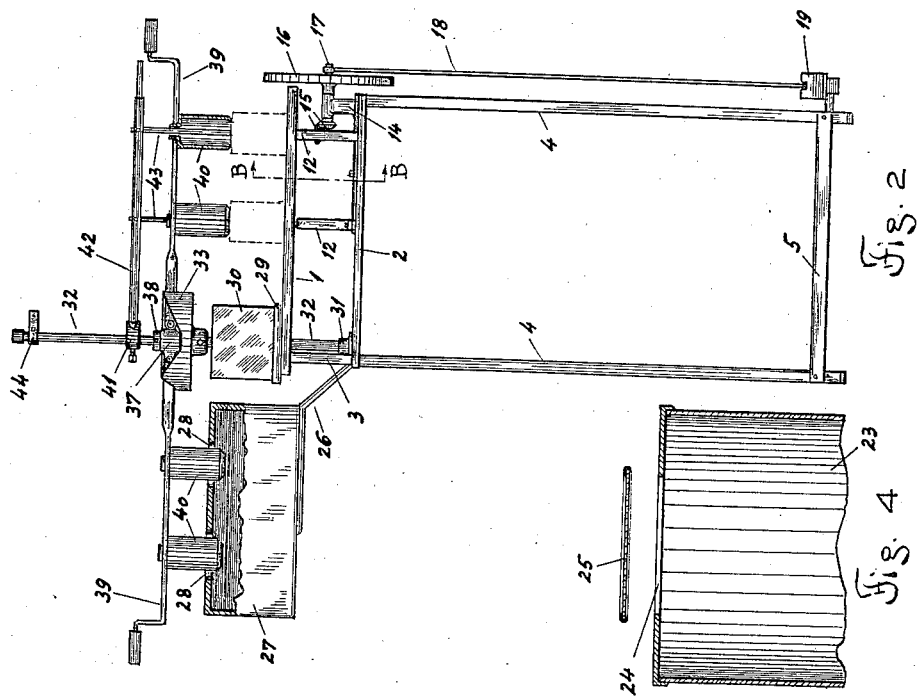
WITNESSES:
INVENTOR
WILEY I. IRWIN
ATTORNEY

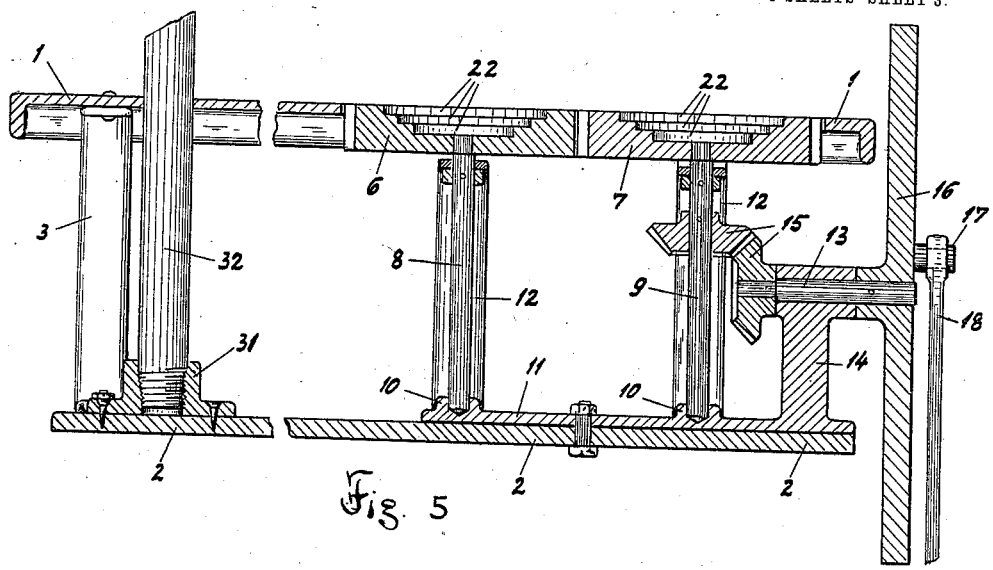
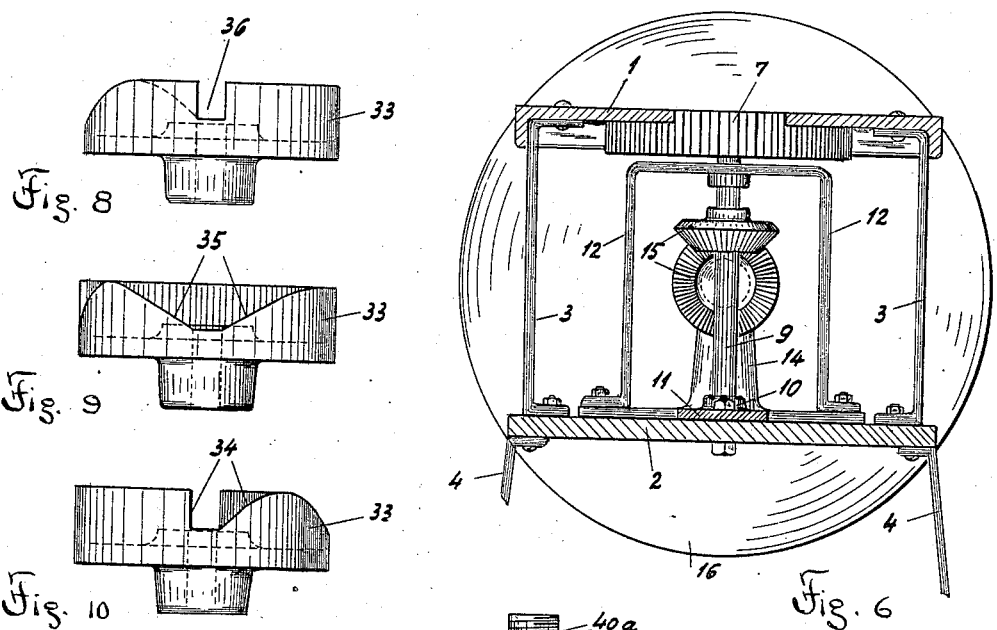

UNITED STATES PATENT OFFICE.

WILEY I. IRWIN, OF SULPHUR SPRINGS, TEXAS.

CAN-SOLDERING MACHINE.

1,043,317.

Specification of Letters Patent.

Patented Nov. 5, 1912.

Application filed May 11, 1912. Serial No. 696,546.

*To all whom it may concern:*

Be it known that I, WILEY I. IRWIN, a citizen of the United States, residing at Sulphur Springs, in the county of Hopkins and State of Texas, have invented certain new and useful Improvements in Can-Soldering Machines, of which the following is a specification.

My invention relates to new and useful improvements in can-soldering machines. Its object is to provide an improved machine for carrying out the process of soldering caps upon a certain type of packers' cans, the process being such as to render the cans air-tight.

A further object is to provide a machine that will be adapted to simultaneously solder caps upon a plurality of cans, and which will be provided with two sets of soldering irons, one set of which will be heated, while the other set is in use.

Another object is to establish a connection between the two sets of soldering irons, such that as one set is shifted from its position of use to the fire-box within which the irons are heated, the other set will be automatically shifted from the fire-box to a position ready for use.

A still further object is to provide means for automatically dipping the tips of the soldering irons into acid as they are being shifted from the fire-box to their position of use.

Other objects are to provide a mechanism for simultaneously rotating a plurality of cans during the process of soldering their caps in place, and to provide a device for holding the caps in firm contact with the can during said soldering process.

Finally, the object of the invention is to provide a device of the character described that will be strong, durable, simple and efficient, and comparatively easy to construct, and also one, the various parts of which will not be likely to get out of working order.

With these and various other objects in view, my invention has relation to certain novel features of the construction and operation, an example of which is described in the following specification, and illustrated in the accompanying drawing, wherein:

Figure 1 is a perspective view of the complete can-soldering machine, showing the positions occupied by the soldering irons, when one set thereof has just been raised from contact with the cans being soldered, and the other set has just been elevated from the fire-box. Fig. 2 is a view of the machine in front elevation, one set of arms being shown in their position of use, and the other set being shown in the fire-box, the latter being shown in partial section. Fig. 3 is an end view of the same. Fig. 4 is a detail, sectional view, showing a certain type of can and a cap which is to be soldered thereupon by means of the herein-described machine. Fig. 5 is a vertical, sectional view taken upon the line A—A of Fig. 3, this view being adapted primarily to show the mechanism for communicating rotation to a number of can-supporting devices. Fig. 6 is another vertical, sectional view taken upon the line B—B of Fig. 2, and serving to further illustrate the mechanism for communicating rotation to a number of can-supporting devices. Fig. 7 is a detail view of one of the soldering irons. Figs. 8, 9 and 10 are different detail views of a peculiar form of cam, whose function in the machine is hereinafter made clear.

Reference will now be made to the numerals which are employed in the several figures of the drawing to designate similar parts.

The numeral 1 denotes a table top of rectangular shape having a down-hanging rim provided at its edges. The table top 1 is supported at an elevation above the shelf 2 by means of four bracket members 3, the shelf 2 being substantially equal in size and shape to the table top 1. The shelf 2 is carried by legs 4 having their lower extremities rigidly connected by brace members 5. The table top 1 is provided with two intersecting apertures in which are mounted a pair of enmeshed spur gears 6 and 7, the upper surfaces of the gears being flush with the surface of the table top 1. The gears 6 and 7 are respectively mounted upon the upper extremities of two vertical shafts 8 and 9, which have their lower extremities received by thrust bearings 10 integrally carried by a metal bar 11, bolted to the shelf 2. A bearing is formed for the upper portions of each of the two shafts 8 and 9 by an arched bracket 12 having its feet bolted to the shelf 2. Adjacent to the shaft 9, a short horizontal shaft 13 is mounted in bearings 14 carried upon one end of the shelf 2. Rotation may be communicated from the shaft 13 to the shaft 9 through a pair of bevel gears 15. Upon the outer extremity of the shaft 13 is mounted a fly wheel 16 provided with a crank pin 17 some distance from its center. The pin 17 is engaged by the upper extremity of a pitman 18, having its lower end connected to a treadle 19, which is mounted fast upon one end of a rock-shaft 20. The rock-shaft 20 is mounted in a pair of bearings 21 secured to the under side of a parallel pair of the brace members 5. The top surfaces of the gears 6 and 7 contain annular recesses or apertures, 22, which recesses are decreased in diameter by a number of successive steps. The several diameters of the recesses 22 correspond to the diameters of several standard sizes of packers' cans 23, thus adapting each gear to receive cans of several sizes, and to securely hold the cans through frictional engagement. The type of can, which is primarily intended for use in conjunction with the herein-described machine is centrally provided in its top with a circular aperture 24, which aperture is adapted to be closed by a solder hemmed cap 25 (see Fig. 4).

The bearing 13 carrying the shaft 14 is at one extremity of the shelf 2. At the other end of said shelf, a pair of brackets 26 project upwardly and outwardly to furnish a support for a fire-box 27, rectangular in shape. The top of the fire-box 27 contains two spaced circular apertures 28, the purpose of which will later be made clear. No particular means for creating heat within the fire-box 27 is shown in the drawing, it being understood that the fire-box may be heated in any of many common and well known ways. An elongated shelf 29 projects forwardly from that extremity of the table top 1 which is adjacent to the fire-box 27, and upon said shelf is mounted a glass vessel 30 intended to contain acid, said vessel being rectangular in shape and having its top open.

A flanged threaded socket 31 is mounted upon that extremity of the shelf 2 from which the fire-box is supported, and within said socket is received the lower extremity of a vertical rod 32, which passes through the table top 1 and projects above the same for some distance. Upon the middle portion of the rod 32, some distance above the table top 1, there is rigidly mounted a cam 33 comprising a circular plate having an upwardly projecting flange at its rim. The upturned edge of the cam 33 is provided with three notches respectively denoted by the numerals 34, 35 and 36, said notches being ninety degrees apart and each differently shaped. A more detailed description of these notches and their several functions will hereinafter be given. Just above the horizontal portion of the cam 33, a collar 37 is rotatably mounted upon the rod 32, said collar being restricted from upward displacement by a set collar 38.

At diametrically opposite points, the collar 37 is provided with lugs, upon each of which is pivoted the inner extremity of an arm 39, the arms 39 being provided upon their outer extremities with handles. The connection between the two arms 39 and the collar 37 is such that either of said arms may be individually swung up and down about its pivoted end, but neither arm can be swung about the rod 32 without producing a consequent rotation of the collar 37 and of the other correlated arm. Each of the arms 39 carries two downwardly projecting soldering irons 40 having the form of hollow cylinders, having their lower extremities open and the edges thereof beveled. The tops of the irons 40 are provided with integral collars 40ª having their outer surfaces threaded, said collars being made to engage within threaded apertures in the correlated arms 39. The space intervening between the central axes of the irons 40 is equal to that existing between the centers of the annular recesses 22, and is also equal to the distance between the centers of the apertures 28. When the arms 39 are being swung from a position above the table top to a position above the fire-box, their inner extremities rest upon the edge of the cam 33, the arms being thus held inclined slightly upward from their inner to their outer ends. The notch 34 in the cam 33 is positioned directly opposite to the fire-box and has one of its walls vertical and the other gradually inclined. Therefore, when one of the arms 39 has been rotated through 180 degrees from a position above the recesses 22, it will drop into the notch 34, thus being brought to a position substantially horizontal, as is shown in Fig. 2 of the drawings. The soldering irons 40 are so positioned upon the arms 39 that their extremities will pass through the apertures 28 and project into the fire-box when the arm carrying said irons drops into the notch 34. As has been previously stated, when one arm is being rotated from its working position above the table to the fire-box, the other arm will simultaneously be rotated in the same direction from the fire-box to the table. A rotative force communicated to an arm 39 which is horizontally disposed above the fire-box will cause said arm to quickly assume an inclined position, owing to the travel of its inner extremity up the inclined wall of the notch 34. When an arm 39, which is being displaced from the fire-box to its working position, has traveled through 90 degrees, it will again be in a horizontal position, this time having its inner end resting in the notch 35, both walls of which are gradually inclined. When the arm is horizontally disposed with its inner end resting in the notch 35, the tips of the correlated soldering irons 40 will be immersed in the acid contained by the vessel 30. As the rotary travel of the arm 39 is continued, it will again assume an inclined position as its inner end travels up the inclined wall of the notch 35. Finally, after the arm in question has rotated through 180 degrees it will drop into the rectangular notch 36 again assuming a horizontal position, such that the lower ends of the soldering irons will bear upon the rims of the solder hemmed caps 25, which have been placed upon the cans seated in the annular apertures 22. From the above description, it is apparent that the operator needs only to grip the handle extremity of one of the arms 39 in order to communicate the desired rotation to both of these arms, and it is also apparent that the soldering irons are successively raised from the fire-box and dipped into the acid, and finally brought to a fixed position above the cans to be soldered without any effort on the part of the operator other than that necessary to communicate a rotation to one of said arms.

A short space above the collar 38 is mounted another set collar 41 carrying an integral lug, upon which the lower extremity of a lever 42 is pivoted, the pivotal axis being such that said lever may swing from a vertical position to a horizontal position parallel with a center line through the recesses 22. The lever 42 carries pivoted rods 43, which, as said lever is swung down, are adapted to pass through the collar 40ª and through the hollow soldering irons 40, the free ends of said rods being finally made to bear upon the caps 25 after the lever has been brought to a position substantially horizontal. While the arms 39 are being subjected to rotation, the lever 42 is held in a vertical position by having its middle portion engaged by a pair of clamping springs 44 rigidly secured to the upper extremity of the rod 32.

In the use of the above-described invention, after two cans of the proper size have been seated in the annular recesses 22, and their respective caps 25 have been laid upon the can tops in a position ready for soldering, the arms 39 are rotated in the manner already described, until the hot irons are brought to their working positions contiguous with the solder hemmed rims of the caps 25. The lever 42 is then lowered to a horizontal position, the rods 43 at the same time being made to pass through the soldering irons so that their lower extremities are brought to bear upon the caps 25. While the operator holds the arm 39 and the lever 42 in the positions described, he brings pressure to bear upon the foot treadle 19, thereby subjecting both cans 43 to a rotation through several revolutions. Through this rotation, all portions of the solder hemmed caps are brought into contact with the hot irons and all of the solder is melted. During this soldering operation, a slight downward pressure is maintained upon the lever 42 in order that the caps may be held in firm contact with the cans. Before the irons have cooled sufficiently to require reheating, it will be possible to subject several sets of cans to the soldering operation just described. By the time that one set of irons have lost their heat, another set of irons will have become sufficiently heated to be ready for use, and the soldering operation therefore, may be immediately continued with the hot irons after those which have become cool, have been swung through a half circle to the fire-box, simultaneously swinging the hot irons to a position above the table top.

Through the provision of two alternately used sets of soldering irons, and through the mechanism by which these two sets of irons are automatically made to replace each other, it is apparent that a considerable economy in time and labor results.

While the machine is particularly intended for the soldering of cans, such as are shown in Fig. 4 of the drawings, it is to be understood that the application of the machine is not necessarily limited to any particular type of cans.

It is also clear that the construction of the invention, as described above, and illustrated in the drawings, may be subjected to a number of modifications and changes without sacrificing any advantages of the device or departing from the spirit thereof. The invention is presented, therefore, as including all such modifications and changes as come within the scope of the following claims.

What I claim is:

1. In a can soldering machine, the combination with a can-receiving device, a fire-box, and two soldering irons, all substantially equidistant from a vertical axis, about which the irons are adapted to rotate as a unit, means for communicating rotation to the can-receiving device, means for supporting the soldering irons during their rotation, allowing either of them to undergo a downward displacement about the can-receiving device and above the fire-box, and means adapted to bear upon the lid of a can held in said can-receiving device.

2. In a can soldering machine, the combination with a can-receiving device, a fire-box, an acid containing vessel and two soldering irons, all substantially equidistant from a vertical axis, about which the irons are adapted to rotate as a unit, of means for communicating rotation to the can-receiving device, means for supporting the soldering irons during their rotation, allowing either of them to undergo a downward displacement above the can-receiving device, above the fire-box and above the acid-containing vessel, and means adapted to bear upon the lid of a can held in said can-receiving device.

3. In a can soldering machine, the combination with a vertical rod, of a can-receiving device, a fire-box, and two soldering irons all substantially equidistant from the vertical rod, two arms oppositely projecting from said rod, and adapted to rotate about the same as a unit, each arm carrying one of said soldering irons, the inner ends of the arms being pivotally supported by the rod, adapting them to swing vertically, an annular cam mounted upon the rod, having an upwardly turned flange upon its rim, supporting the inner ends of said arms, notches being provided in the edge of the rim respectively opposite to the can-receiving device and fire-box, and a mechanism for communicating rotation to the can-receiving device.

4. In a can soldering machine, the combination with a vertical rod, of a can-receiving device, a fire-box, and two soldering irons all substantially equidistant from the vertical rod, two arms oppositely projecting from said rod, and adapted to rotate about the same as a unit, each arm carrying one of said soldering irons, the inner ends of the arms being pivotally supported by the rod, adapting them to swing vertically, an annular cam mounted upon the rod, having an upwardly turned flange upon its rim, supporting the inner ends of said arms, notches being provided in the edge of the rim respectively opposite to the can-receiving device and fire-box, a mechanism for communicating rotation to the can-receiving device, and means adapted to bear upon the lid of a can held in said can-receiving device.

In testimony whereof I have signed my name to this specification in the presence of two subscribing witnesses.

WILEY I. IRWIN.

Witnesses:
D. E. MOGRILL,
CHAS. F. ASHCROFT.

---

Copies of this patent may be obtained for five cents each, by addressing the "Commissioner of Patents, Washington, D. C."